United States Patent
Fryd et al.

[11] Patent Number: 5,817,419
[45] Date of Patent: Oct. 6, 1998

[54] TETRAFLUOROETHYLENE COPOLYMER COATING COMPOSITION

[75] Inventors: Michael Fryd, Moorestown, N.J.; Peter Louis Huesmann, Wilmington, Del.; Allan Harold Olson, Parkersburg, W. Va.

[73] Assignee: E. I. du Pont de Nemours and Company, Wilmington, Del.

[21] Appl. No.: 682,870

[22] Filed: Jul. 12, 1996

Related U.S. Application Data

[60] Provisional application No. 60/001,128, Jul. 13, 1995.

[51] Int. Cl.$^6$ .......................... B32B 27/28; B32B 27/30; C08L 27/12; C08L 27/18
[52] U.S. Cl. .......................... 428/422; 428/327; 428/421; 428/522; 524/519; 524/520; 524/522; 524/523; 525/199; 525/200
[58] Field of Search .................................. 428/327, 421, 428/422, 522; 524/519, 520, 522, 523, 524; 525/199, 200, 221, 222, 224, 227

[56] References Cited

U.S. PATENT DOCUMENTS

| | | | |
|---|---|---|---|
| 3,679,618 | 7/1972 | Lohr | 260/21 |
| 3,904,575 | 9/1975 | Satokawa et al. | 260/32.8 |
| 4,118,537 | 10/1978 | Vary et al. | 428/422 |
| 4,252,859 | 2/1981 | Concannon et al. | 428/422 |
| 4,383,075 | 5/1983 | Abel | 524/512 |
| 4,568,573 | 2/1986 | Sunada et al. | 427/350 |
| 5,164,426 | 11/1992 | Shimizu et al. | 523/201 |
| 5,223,562 | 6/1993 | Sagawa et al. | 524/275 |
| 5,230,961 | 7/1993 | Tannenbaum | 428/422 |
| 5,272,186 | 12/1993 | Jones | 523/339 |
| 5,349,003 | 9/1994 | Kato et al. | 524/458 |
| 5,478,651 | 12/1995 | Tannenbaum | 428/422 |
| 5,562,991 | 10/1996 | Tannenbaum | 428/421 |

FOREIGN PATENT DOCUMENTS

| | | |
|---|---|---|
| 0 193 963 B1 | 10/1991 | European Pat. Off. |
| 1-16855 | 3/1989 | Japan |
| 1-25506 | 5/1989 | Japan |
| WO 93/03919 | 3/1993 | WIPO |
| WO 93/03921 | 3/1993 | WIPO |

OTHER PUBLICATIONS

Dialog Information Services, File 351, Derwent WPI, Dialog accession No. 009410975, Du Pont Japan Ltd. (Feb. 1993).

*Primary Examiner*—Vivian Chen

[57] ABSTRACT

An aqueous dispersion contains melt-fabricable fluoropolymer particles and acrylic copolymer particles, said acrylic copolymers having a decomposition temperature of less than 340° C., wherein the dispersion contains about 75 to about 95 wt % of fluoropolymer and about 5 to about 25 wt % of acrylic copolymer, based on combined weights of the two polymers. Coated articles comprise a substrate coated with a primer layer, optional intermediate coats, and a topcoat with at least the topcoat being formed from the aqueous dispersion.

14 Claims, No Drawings

TETRAFLUOROETHYLENE COPOLYMER COATING COMPOSITION

This Application claims the benefit of U.S. Provisional Patent Application No. 60/001,128, filed on Jul. 13, 1995 in the names of Huesmann et al. and entitled "Tetrafluoroethylene Copolymer Coating Composition"; the disclosure of which is hereby incorporated by reference.

FIELD OF THE INVENTION

This invention is in the field of fluoropolymer dispersion compositions. These compositions can be used to apply coating to various substrates, particularly cookware.

BACKGROUND OF THE INVENTION

Fluoropolymer coating compositions that can achieve greater coating thickness in each application and can be baked at lower temperature during coating application are desired for assorted reasons. Higher build has obvious benefits with respect to coating thickness or in reducing the number of passes required to achieve a specified thickness. Coating on cast aluminum presents problems due to voids (air pockets) in the aluminum that can expand and form bubbles. A coating that could be baked at lower temperature would alleviate this problem.

Vary & Vassiliou in U.S. Pat. No. 4,118,537 disclose a liquid coating composition, comprising fluorocarbon polymer and a polymer of monoethylenically unsaturated monomers that decomposes in a temperature range of from about 150° C. below the fusion temperature of the fluorocarbon polymer to about the fluorocarbon polymer's decomposition temperature. This composition is disclosed to make coatings denser and less porous than previously possible, and having improved appearance and cleaning characteristics. However, the reference does not teach one skilled in the art how to achieve such coatings at lower baking temperature.

Japanese Patent Publication Nos. H01-016855 (1989) and H01-025506 (1989) disclose aqueous dispersion compositions based on resin particles of copolymers of tetrafluoroethylene and fluorovinyl ether, the particles having average diameter of 0.3–1 µm and the resin having MV of 0.3–5×$10^4$ poise or 0.3–10×$10^4$ poise, respectively. These references teach that MV in excess of the recited upper limits results in greater surface roughness, a tendency toward mud cracking, and resultant difficulty in achieving the desired film thickness. While large resin particle size is intended to facilitate coating of thicker films, the viscosity of the dispersion compositions must be increased to retard sedimentation attendant to the larger particles.

It is desirable to be able to employ higher melt viscosity (MV) resins in such coatings to extend the range of utility. For example, higher MV coatings would have less tendency to sag on vertical or steeply inclined surfaces at high service temperature.

SUMMARY OF THE INVENTION

This invention provides a dispersion composition comprising aqueous medium, particles of melt-fabricable tetrafluoroethylene copolymer, and particles of acrylic copolymer having decomposition temperature of less than about 340° C. as determined by thermogravimetric analysis. The invention also provides coatings derived from this dispersion composition.

The invention further provides a prime coat, and a dispersion composition useful as a primer, comprising melt-fabricable tetrafluoroethylene copolymer having high viscosity.

DETAILED DESCRIPTION

It has been discovered that a dispersion composition comprising melt-fabricable fluoropolymer particles and particles of acrylic copolymer having decomposition temperature of less than about 340° C. can be employed to make coatings that are essentially defect-free, with shorter baking time at lower baking temperature. Surprisingly, the presence of the acrylic copolymer in the dispersion composition of this invention permits the use of fluoropolymer having MV substantially higher than could previously be used to obtain smooth, crack-free coatings. Additionally, it has been discovered that melt-fabricable fluoropolymer having relatively high MV can be used in conjunction with adhesion promoters in prime coats and in dispersion compositions useful as primers.

Coated articles of this invention comprise a substrate coated with a coating having at least two layers, comprising a prime coat, a topcoat, and optionally one or more intermediate coats between said primer and said topcoat. At least one of said topcoat and intermediate coats is formed from dispersion composition comprising fluoropolymer and acrylic polymer. Fluoropolymers that can be used in the dispersion compositions of this invention comprise copolymers of at least two perfluorinated monomers. The perfluorinated monomers one or more of those in the group consisting of perfluoroolefins having 2–8 carbon atoms and perfluorinated vinyl ethers (FVE) of the formula $CF_2$=CFOR or $CF_2$=CFOR'OR wherein —R, and —R'— are independently completely-fluorinated linear or branched alkyl and alkylene groups containing 1–8 carbon atoms. Preferred —R groups contain 1–4 carbon atoms, while preferred —R'— groups contain 2–4 carbon atoms. Fluoropolymers used in this invention include but are not limited to the group of melt-fabricable copolymers of tetrafluoroethylene (TFE) with sufficient concentrations of at least one copolymerizable monomer to reduce the melting point significantly below that of polytetrafluoroethylene (PTFE). Such copolymers having melt viscosity (MV) in the range of from about 0.5×$10^3$ to about 200×$10^3$ Pa.s as determined at 372° C. can be used. Copolymers having MV in the range about 1×$10^3$ to 100×$10^3$ Pa.s are normally preferred. Copolymers having MV in the range about 10×$10^3$ to about 80×$10^3$ Pa.s and exhibiting MIT flex life of at least 20,000 cycles are normally employed. Copolymers that exhibit this flex life performance are more durable and will have a longer lifetime in service due to high stress crack resistance. Comonomers with TFE can include perfluoroolefins having at least 3 carbon atoms and FVE, for example. Preferred FVE are perfluoro(alkyl vinyl ethers) (PAVE, $CF_2$=CFOR) with alkyl group containing 1–3 carbon atoms. The combinations TFE/HFP, TFE/PAVE, and TFE/HFP/PAVE are most preferred. One skilled in the art will recognize that the amount of comonomer used in TFE copolymers will vary with the properties desired and the comonomer or comonomers chosen. Generally, the amount of comonomer is in the range about 2 to about 20 wt % based on the total weight of copolymer. Higher concentrations can be used if lower melting point is desired. For TFE/HFP dipolymer, HFP concentration is typically in the range about 10 to about 16 wt %. For TFE/PAVE dipolymer, PAVE concentration would vary with the length of the alkyl group. When PAVE is perfluoro(propyl vinyl ether) (PPVE), PPVE concentration is typically in the range about 2 to about 5 wt %.

Fluoropolymer resin is present in the dispersion compositions of this invention as small, substantially spherical particles, typically having average diameter in the range about 100 to about 500 nm, normally 230–330 nm. A particle size of at least about 230 nm is desirable to minimize mud-cracking and facilitate defect free film formation at coating thickness of at least about 1 to about 2 mil (25–50 μm). A particle size of no more than about 330 nm is usually preferred to produce coating formulations with acceptable settling stability. Such fluoropolymer resin particles, having polymer compositions as discussed above, can be produced directly in dispersion form by the technique known as dispersion polymerization, sometimes called emulsion polymerization. Fluoropolymer dispersion having particles of desired size can be produced in an aqueous free radical initiated polymerization by controlling the number of particles nucleated in the initial stage of polymerization. This can be achieved, for example, by introducing only a small portion of surfactant prior to initiation of the polymerization with the large portion of the surfactant being added after initiation, e.g., refer to U.S. Pat. No. 3,391,099 to Punderson (1968). Optionally, a seed polymerization method can be employed, wherein a first dispersion or latex having small particle size is used as a seed for a second polymerization. Various particle architectures can be achieved, either by standard dispersion polymerization or by seed polymerization, wherein polymer composition and/or molecular weight are varied within the particle. Dispersion polymerization techniques are illustrated, for example, in U.S. Pat. Nos. 2,946,763 (TFE/HFP) and 3,635,926 (TFE/PAVE), and in SIR H310 (TFE/HFP/PAVE). The disclosure of the aforementioned U.S. Patents and patent publications is hereby incorporated by reference.

An acrylic polymer, which functions as a film former, is used in one embodiment of the dispersion compositions of this invention. As used herein, "film former" indicates that the acrylic polymer readily forms a film at ambient temperature or above as the liquid medium of the dispersion evaporates. It is desired for the film former acrylic polymer to have low glass transition temperature ($T_g$), such as $T_g$ of less than about 40° C., even more desirably less than 30° C. It is also desired that the film former decompose and evaporate cleanly after the fluoropolymer resin particles start to coalesce into a coherent fluoropolymer film. These processes, that is, liquid evaporation, film forming, film former decomposition, and fluoropolymer resin coalescence, take place at very high rates in commercial coating processes. Normally, the acrylic polymer decomposes at a temperature of less than about 380° C., more preferably less than 340° C., determined as outlined below. Low decomposition temperature of the acrylic polymer is favored by selection of monomer units that provide bulky side groups in the polymer, i.e., side groups having at least 2 atoms, preferably at least 4 atoms, other than hydrogen. Butyl acrylate (BA), butyl methacrylate (BMA), and methacrylic acid (MAA) are examples of monomers that provide bulky side groups. Suitable acrylic polymers include copolymers of BA or BMA with MAA. In such copolymers, $T_g$ increases with MAA content, so MAA content should be low in order to realize the desirable values of $T_g$ as recited above. For copolymers of BMA and MAA, composition can be in the range BMA/MAA=93/7 to 98/2 by weight, usually 95/5 to 97/3. A nominal composition of BMA/MAA=96/4 by weight has been found to be satisfactory. The acrylic copolymer can be made by conventional aqueous polymerization procedures to obtain an aqueous dispersion.

Dispersion compositions of this invention comprising melt-fabricable fluoropolymer and acrylic polymer as described above generally contain about 75 to about 95 wt % of fluoropolymer resin and about 5 to about 25 wt % of acrylic polymer resin, based on combined weights of the two resins. Preferred proportions are normally about 86 to about 91 wt % fluoropolymer and about 9 to about 14 wt % acrylic polymer.

The prime coat of this invention generally contains an adhesion promoter and a fluoropolymer. Adhesion promoters that can be used include at least one of polyamide imide, polyarylene sulfide and polyether sulfone resins. Polyamide imide is preferred, either alone or in combination with other adhesion promoter. Such adhesion promoters are commercially available. The adhesion of high melt viscosity fluoropolymer coatings to all types of metal substrates, particularly to smooth metal, can be significantly improved through chemically induced stratification or formation of a concentration gradient in the primer. Such a concentration gradient is described in U.S. Pat. No. 5,230,961 (Tannenbaum) and the references cited therein; all of which are hereby incorporated by reference.

Fluoropolymer that can be used in the prime coat of this invention includes high molecular weight polytetrafluoroethylene (PTFE) as known in the art, and the blends of PTFE and melt-fabricable fluoropolymer as disclosed by U.S. Pat. No. 5,230,961 (Tannenbaum).

A preferred fluoropolymer for the prime coat of this invention is a non-melt-fabricable TFE copolymer (modified PTFE), said copolymer containing at least about 0.001% by weight of comonomer and having standard specific gravity (SSG) of at least about 2.165 and MV in the range from about $1 \times 10^7$ to about $1 \times 10^9$ Pa.s. Typically, SSG is at least about 2.180 and MV is from about $5 \times 10^7$ to about $3 \times 10^8$ Pa.s. Modifying monomer can be, for example, perfluorobutyl ethylene (PFBE), chlorotrifluoroethylene (CTFE), perfluoroolefins having 3–8 carbon atoms, or other monomer that introduces side groups into the molecule. Fluorinated monomers include those in the group consisting of fluorinated vinyl ethers (FVE) of the formula $CF_2$=CFOR or $CF_2$=CFOR'OR wherein —R, and —R'— are independently completely-fluorinated or partially-fluorinated linear or branched alkyl and alkylene groups containing 1–8 carbon atoms, respectively. Preferred —R groups contain 1–5 carbon atoms, while preferred —R'— groups contain 2–4 carbon atoms. Perfluorinated monomers are preferred as modifying monomers, and include hexafluoropropylene (HFP) and perfluoro(alkyl vinyl ether) (PAVE) with alkyl group containing 1–3 carbon atoms.

Melt-fabricable fluoropolymer can also be used in the prime coat of this invention. TFE copolymers as described above and having MV in the range of from about $15 \times 10^3$ to about $200 \times 10^3$ Pa.s can be used. Preferably, if melt-fabricable TFE copolymer is the sole fluoropolymer component, the MV range is from $40 \times 10^3$ to at least about $100 \times 10^3$ Pa.s, e.g., an MV of about $40 \times 10^{\wedge}4$ Pa.s. Normally, the comonomer comprises PAVE with alkyl group containing 2–3 carbon atoms, and the comonomer content is from about 0.5 to about 5 wt %. Dispersion compositions comprising melt-fabricable fluoropolymer as described in this paragraph and adhesion promoter as described above are another aspect of this invention.

Proportions of fluoropolymer are preferably in the range of about 8:1 to about 1:1, more preferably in the range of about 6:1 to about 1.5:1 by weight.

Dispersion compositions of this invention can contain, in addition to fluoropolymer and either acrylic or adhesion promoter, one or more additives to enhance shelf life of the composition, coating characteristics, and/or properties of the coating on a substrate, such as antioxidants, pigments, viscosity modifiers, fillers, surfactants, flow control agents, anti-microbial agents, and the like.

EXAMPLES

Solids content of TFE copolymer raw dispersion (as polymerized) was measured gravimetrically, that is, by weighing a sample before and after drying. Raw dispersion particle size (RDPS) was measured by photon correlation spectroscopy.

Samples of melt-fabricable TFE copolymer resin were prepared for measurement of melt viscosity (MV), comonomer content, and flex life by coagulating the raw dispersion by vigorous agitation, separating the liquid, and drying at 150° C. for about 72 hr in a circulating air oven. MV was measured at 372° C. by the method disclosed in U.S. Pat. No. 4,380,618; hereby incorporated by reference. PPVE content of the TFE copolymer resins was determined by Fourier transform infrared spectroscopy by the method disclosed in the same reference.

Samples of modified PTFE resin were prepared for measurement of standard specific gravity (SSG), melt viscosity (MV), and rheometer pressure by coagulating the raw dispersion by vigorous agitation, separating the liquid, and drying at 150° C. for about 72 hr in a circulating air oven. SSG was measured by the method of ASTM D-4894. MV was measured 380° C. by the tensile creep method disclosed in U.S. Pat. No. 4,837,267; hereby incorporated by reference. Rheometer pressure was measured by the method of ASTM D-1457 Section 13.10 using 18.4 wt % Isopar® G (Exxon) lubricant and a reduction ratio of 1600:1.

The standard MIT folding endurance tester described in ASTM D-2176 was used for determining flex life (MIT Flex Life). Measurements were made using compression-molded films that were quenched in cold water. Film thickness was approximately 0.008 inch (0.20 mm). High flex life is an indicator of toughness and stress crack resistance.

To prepare concentrated and stabilized dispersions, raw dispersion was concentrated to about 60 wt % solids based on total solids and liquid by the method disclosed by Marks & Whipple in U.S. Pat. No. 3,037,953 (hereby incorporated by reference) using Triton® X-100 non-ionic surfactant (Union Carbide). Optionally, additional surfactant was added to adjust surfactant concentration to desired level. Surfactant concentration is expressed in wt % based on weight of PTFE solids.

For the acrylic copolymer, $T_g$ was determined by differential scanning calorimetry at a heating rate of 10° C./min. Decomposition of the acrylic copolymer was characterized by thermogravimetric analysis.

Coatings having a prime coat and a topcoat were made from primer and topcoat formulations based on concentrated dispersions as detailed in the examples to follow. An aluminum substrate surface was prepared by washing with acetone to remove oil and dirt, and air dried or dried at 150° F. (66° C.) for 10 min. The prime coat was applied by spraying to obtain a dry film thickness (DFT) of 5–10 μm. The topcoat was then sprayed to obtain a topcoat thickness of 15–25 μm DFT. The films were then baked for 10 min at 300° F. (149° C.) followed by a high temperature bake for 10 min at a temperature of 750° F. (399° C.) or 15 min at a temperature of 716° F. (380° C.). For tests reported below, total DFT values were in the range 0.9–1.2 mil (22.9–30.5 μm).

Substrates coated as above were subjected to a post water adhesion (PWA) test, as follows. The coated substrate is soaked in boiling water for 20 min. The coating was cut down to the substrate, and an operator then attempts to pull back the coating with a fingernail. If the coating can be pulled away from the substrate for 1 cm or more, the coating is considered to fail the PWA test. If the coating cannot be pulled loose for a distance of 1 cm, the coating is considered to pass the PWA test.

Substrates coated as above were also subjected to a cross-hatch (x-hatch) test for adhesion. The coated sample is scribed with a razor blade, aided by a stainless steel template, to make 11 parallel cuts about 3/32 inch (2.4 mm) apart through the film to the metal surface. This procedure is repeated at right angles to the first cuts to produce a grid of 100 squares. The coated and scribed sample is immersed in boiling water for 20 minutes, and then is removed from the water and cooled to room temperature without quenching the sample. Then a strip of transparent tape (3M Brand No. 898), 0.75 by 2.16 inch (1.9 by 5.5 cm), is pressed firmly over the scribed area with the tape oriented in a parallel direction to the scribed lines. The tape is then pulled off at a 90° angle rapidly but without jerking. This step is repeated at a 90° angle to the first step with a fresh piece of tape, and then repeated two times more again at 90° angles to the previous step, each time with a fresh piece of tape. Passing the test requires that no squares be removed from the 100-square grid.

Coating quality was assessed microscopically at 30× magnification for mud cracking and other defects both after the 300° F. bake and again after the high temperature bake. Coating smoothness was judged visually in terms of the degree of "orange peel" appearance.

Example 1 Synthesis of Acrylic

An aqueous dispersion of an acrylic polymer of 96 wt % butyl methacrylate (BMA) and 4 wt % methacrylic acid (MAA) was prepared by charging the following constituents into a reactor equipped with a heat source, a thermometer and a stirrer.

| Portion | Ingredient | Wt Parts |
|---|---|---|
| 1 | Demineralized water | 3888.0 |
|   | Sodium lauryl sulfate (30% aqueous) | 11.1 |
| 2 | Butyl methacrylate | 3326.4 |
|   | Methacrylic acid | 138.7 |
| 3 | Demineralized water | 679.2 |
|   | Sodium lauryl sulfate (30% aqueous) | 60.5 |
| 4 | Demineralized water | 176.2 |
|   | Ammonium persulfate | 5.8 |
| 5 | Demineralized water | 44.2 |
|   | Anmionium persulfate | 1.1 |
| 6 | Demineralized Water | 271.2 |
|   | triethanol amine | 62.4 |
|   | Total | 8664.8 |

Portion 1 was charged into the reaction vessel, blanketed with nitrogen and heated to 80° C. with continued stirring. Portion 4 was added and then Portions 2 and 3 were added over 160 min. Portion 5 was added and then after 90 min the contents of the vessel were cooled to 30° C. Portion 6 was added over 15 min with continued stirring. The resulting aqueous dispersion had a solids content of 40.7 wt %, an average particle size of 148 nm, a $T_g$ of 28.6° C. and a maximum rate of decomposition at 325° C. as measured by TGA.

Example 2

A cylindrical, horizontally disposed, water-jacketed, paddle-stirred stainless steel reactor having a length to diameter ratio of about 1.5 and a water capacity of 79 parts by weight, was charged with 52 parts of demineralized water. The reactor was evacuated, purged with TFE, and then evacuated again. The reactor was then pressured with ethane to give a 6-inch mercury (152 mmHg) pressure rise. The remaining vacuum in the reactor was then used to draw in 0.67 part of PPVE followed by a solution of 0.002 part of ammonium perfluorooctanoate (C-8) surfactant and 0.022 part concentrated ammonium hydroxide in 0.56 part water. The reactor was then sealed, agitation was begun at 50 rpm, and the reactor temperature was raised to 75° C. After the temperature had become steady at 75° C., TFE was added to the reactor to achieve a pressure of 300 psig (2.17 MPa). This was followed by pumping 0.88 part freshly prepared aqueous initiator solution containing 0.20 wt % of ammonium persulfate (APS). When this was complete, addition of a second initiator solution containing 0.2 wt % APS and 1 wt % concentrated ammonium hydroxide was started at a rate of 0.011 part/min. When polymerization had begun (kickoff) as indicated by a 10 psig (0.07 MPa) drop in reactor pressure, additional TFE was added to maintain pressure constant at 300 psig. Then PPVE was pumped to the reactor at a rate of 0.0057 part/min, and the agitator speed was adjusted to control the TFE feed rate at 0.167 part/min. After 3 parts of TFE were added to the reactor, 2.26 parts of an aqueous solution of 5.11 wt % C-8 were added to the reactor at a rate of 0.226 part/min. After 20 parts of TFE had been added to the reactor following kickoff (131 minutes), the TFE, initiator and PPVE feeds were stopped, the agitator was stopped, and the reactor was vented slowly and swept with nitrogen until the pressure was below 5 psig (0.14 MPa). The reactor was cooled to 50° C. and the dispersion was discharged from the reactor and saved. The raw dispersion had solids content of 28.7 wt % and RDPS was 251 nm. MV of the TFE/PPVE copolymer was $6.2 \times 10^3$ Pa.s and PPVE content was 4.12 wt %. A portion of the raw dispersion was concentrated to 65.6 wt % solids and 3.5 wt % Triton® X-100.

Example 3

The procedure of Example 2 was essentially repeated, except that the initial charge of PPVE was 0.79 part, the solution following the initial charge of PPVE contained no C-8, the temperature was 80° C., the pressure after TFE addition was 380 psig (2.72 MPa), addition of C-8 solution started after 1 part of TFE was added to the reactor, concentration of that solution was 5.28 wt % C-8, the PPVE pumping rate during polymerization was 0.0048 part/min, and the agitator speed was adjusted to control the TFE feed rate at 0.16 part min. The raw dispersion had solids content of 27.7 wt % and RDPS was 295 nm. MV of the TFE/PPVE copolymer was $5.0 \times 10^4$ Pa.s and PPVE content was 3.30 wt %. A portion of the raw dispersion was concentrated to 60.1 wt % solids and 5.6 wt % Triton® X-100.

Example 4

Example 3 was essentially repeated except that the PPVE pumping rate during polymerization was 0.0057 part/min. The raw dispersion had solids content of 29.3 wt % and RDPS was 285 nm. MV of the TFE/PPVE copolymer was $5.7 \times 10^3$ Pa.s and PPVE content was 3.15 wt %. A portion of the raw dispersion was concentrated to 60.1 wt % solids and 5.6 wt % Triton® X-100.

Example 5

The procedure of Example 3 was essentially repeated, except that the initial charge of PPVE was 0.51 part, the initial solution of C-8 and ammonium hydroxide contained 0.0005 part of C-8 in 0.55 part of water, the temperature was 70° C., the concentration of the C-8 solution added to the reactor during polymerization was 5.14 wt % C-8, and the PPVE pumping rate during polymerization was 0.0040 part/min. The time to add 20 parts of TFE after kickoff was 145 min. The raw dispersion had solids content of 28.7 wt % and RDPS was 259 nm. MV of the TFE/PPVE copolymer was $6.3 \times 10^4$ Pa.s, PPVE content was 2.23 wt %, and MIT Flex Life was 66755 cycles. A portion of the raw dispersion was concentrated to 62.1 wt % solids and 5.5 wt % Triton® X-100.

Example 6

The procedure of Example 6 was essentially repeated except that the initial charge of PPVE was 0.23 part and the PPVE pumping rate during polymerization was 0.0019 part/min. The time to add 20 parts of TFE after kickoff was 132 min. The raw dispersion had solids content of 28.2 wt % and RDPS was 248 nm. MV of the TFE/PPVE copolymer was $8.7 \times 10^4$ Pa.s, PPVE content was 1.00 wt %, and MIT Flex Life was 16271 cycles. A portion of the raw dispersion was concentrated to 60.2 wt % solids and 5.6 wt % Triton® X-100.

Example 7

The same reactor used in Example 2 was charged with 50 parts of demineralized water and 0.012 part of a 20% (wt/wt) solution of C-8 in water. The reactor was sealed and agitation was begun at 50 rpm. The reactor was then evacuated, purged with TFE, and evacuated again. The reactor temperature was raised to 103° C. and charged with 0.28 part of PPVE. With the temperature steady at 103° C., HFP was added to the reactor to achieve a pressure of 410 psig (2.93 MPa) followed by adding TFE to bring the final pressure to 600 psig (4.24 MPa). This was followed by pumping 0.386 part of freshly prepared aqueous initiator solution containing 0.8 wt % of APS and 0.8 wt % of KPS at a rate of 0.110 part/min. Then the rate of addition of the initiator solution was slowed to 0.0068 part/min for the remainder of the process. When polymerization had begun (kick-off) as indicated by a 10 psig (0.07 MPa) drop in reactor pressure, additional TFE was added to maintain pressure constant at 600 psig (4.24 MPa). After 1 part TFE had been added to the reactor, 2.27 parts of an aqueous solution of 6.25 wt % C-8 were added to the reactor at a rate of 0.227 part/min. After 3 parts of TFE had been added to the reactor, the agitator speed was adjusted to control the TFE feed rate at 0.1 part/min. After a total 19 parts of TFE had been added to the reactor after kickoff (190 min), the TFE and initiator feeds were stopped. Agitation was continued and the reactor was cooled to 90° C. Then the agitator was stopped and the reactor was vented to a pressure of 1–2 psig and swept with nitrogen. The reactor was cooled to 50° C. and the dispersion was discharged from the reactor and saved. Solids content of the raw dispersion was 32.2 wt % and RDPS was 288 nm. MV of the TFE/HFP/PPVE copolymer was $6.2 \times 10^3$ Pa.s, PPVE content was 0.7 wt %, and HFP index was measured at 3.35. HFP index, introduced by Bro & Sandt in U.S. Pat. No. 2,946,763; hereby incorporated by reference, is an infrared measure of the HFP content in the copolymer. No correction of HFPI for PPVE was made. A portion of the raw dispersion was concentrated to 61.0 wt % solids and 5.4 wt % Triton® X-100.

Example 8

The reactor used in Example 2 was charged with 42 parts of demineralized water and 1.32 parts of hydrocarbon wax.

The reactor was heated to 65° C., evacuated, purged with TFE, and then evacuated again. The vacuum in the reactor was then used to draw in a solution of 0.0044 part of C-8 and 0.0018 part of methanol in 1.50 parts of water. The reactor was then sealed, agitation was begun at 46 rpm, and the reactor temperature was raised to 90° C. After the temperature had become steady at 90° C., TFE was added to the reactor to achieve a final pressure of 400 psig (2.86 MPa). Then 0.115 part of PPVE was pumped to the reactor. This was followed by pumping 2.205 part of freshly prepared aqueous initiator solution containing 0.06 wt % of APS and 4 wt % of DSP into the reactor. After the polymerization had begun as indicated by a 10 psig (0.07 MPa) drop in reactor pressure, additional TFE was added to maintain pressure constant at 400 psig. After 3 parts of TFE were added to the reactor, 2.26 parts of an aqueous solution of 5.0 wt % C-8 were added to the reactor at a rate of 0.112 part/min. After a total of 33 parts of TFE had been added to the reactor after kickoff (133 min), the TFE feed was then stopped and the polymerization was continued until the pressure dropped to 175 psig (1.31 MPa). Then the agitator was stopped, and the reactor was vented and cooled to 80° C. The modified PTFE dispersion was then discharged from the reactor and saved. The solids content of the raw dispersion was 45.5 wt % and RDPS was 253 nm (PCS method). SSG was 2.227, MV was $1.8 \times 10^8$ Pa.s, and PPVE content was 0.21 wt % Rheometer pressure 9751 psi (67.2 MPa). A portion of the raw dispersion was concentrated to 59.9 wt % solids and 5.7 wt % Triton® X-100.

Example 9

The procedure of Example 8 was essentially repeated except that the solution drawn into the reactor after final evacuation contained 0.0551 part of C-8, 0.00015 part of Triton® X-100 and 0.0014 part of methanol, the PPVE charge was 0.108 part, and the concentration of the C-8 solution pumped into the reactor during polymerization was 3.3 wt % C-8. The solids content of the modified PTFE raw dispersion was 45.5 wt % and RDPS was 150 nm (turbidity method). SSG was 2.219, MV was $8.0 \times 10^8$ Pa.s, and PPVE content. Rheometer pressure 7827 psi (54.0 MPa). A portion of the raw dispersion was concentrated to 61.6 wt % solids and 5.5 wt % Triton® X-100.

Example 10

The procedure of Example 2 was essentially repeated, except that the initial solution of C-8 and ammonium hydroxide contained 0.116 part of C-8, and no C-8 was pumped during polymerization. The raw dispersion had solids content of 28.0 wt % and RDPS was 180 nm. MV of the TFE/PPVE copolymer was $7.3 \times 10^3$ Pa.s, and PPVE content was 4.0 wt %. A portion of the raw dispersion was concentrated to 59.8 wt % solids and 4.6 wt % Triton® X-100.

Example 11

The procedure of Example 5 was essentially repeated. RDPS was 194 nm. MV of the TFE/PPVE copolymer was $4.6 \times 10^3$ Pa.s, and PPVE content was 3.89 wt %.

Example 12 Primer Formulations

Primer coating formulations were prepared using blending techniques normal in the art, and are summarized in Table 1. For those ingredients introduced as aqueous dispersions (e.g., fluoropolymer, polyamide imide), the amounts shown are the solids fractions. The amounts of water introduced by such dispersions are consolidated in a single entry for water which includes any added demineralized water. The polyamide imide dispersion was that disclosed by Vassiliou in U.S. Pat. No. 4,049,863 and the ultramarine blue was that disclosed by Concannon and Rummel in U.S. Pat. No. 4,425,448; the disclosure of both of which is hereby incorporated by reference. The fluoropolymer designated as FEP was a TFE/HFP copolymer having HFPI of 3.80 and MV of $3.5 \times 10^3$ Pa.s, prepared as an aqueous dispersion generally according to Bro & Sandt (U.S. Pat. No. 2,946,763 hereby incorporated by reference) having RDPS of 185 nm and concentrated to 55.5 wt % solids and 4.6 wt % Triton® X-100.

TABLE 1

Primer Formulations

| Ingredient Amount (wt %) | | | |
|---|---|---|---|
| P1 | P2 | P3 | Ingredient |
| 3.41 | 5.89 | 6.73 | Ultramarine Blue |
| 4.83 | — | — | Afflair ® pigment (EM Industries) |
| — | — | 0.01 | Zinc oxide |
| — | — | 1.00 | Colloidal silica (Ludox ® AM, DuPont) |
| 5.16 | — | — | Modified PTFE (Ex. 8) |
| — | 5.51 | — | Modified PTFE (Ex. 9) |
| — | — | 11.08 | TFE/PPVE copolymer (Ex. 5) |
| 3.53 | — | — | FEP fluoropolymer |
| — | 3.76 | — | TPE/PPVE copolymer (Ex. 11) |
| 5.63 | 6.00 | 4.86 | Polyamide imide (AI-10, Amoco) |
| 0.24 | 0.25 | 0.25 | Surfynol ® 440 (Air Products) |
| 0.73 | 0.55 | 0.70 | Triton ® X-100 (Union Carbide) |
| 67.57 | 68.52 | 66.44 | Water |
| 0.71 | 0.76 | 0.68 | Diethylethanol amine |
| 1.43 | 1.52 | 1.36 | Triethyl amine |
| 3.94 | 4.22 | 3.75 | Furfuryl alcohol |
| 2.81 | 3.00 | 3.15 | N-methyl-2-pyrrolidone |

Example 13

Topcoat coating formulations were prepared using blending techniques normal in the art, and are summarized in Table 2. The presentation of ingredients introduced as aqueous dispersions is as for the primers in Example 10.

TABLE 2

Topcoat Formulations

| Ingredient Amount (wt %) | | | | |
|---|---|---|---|---|
| T1 | T2 | T3 | T4 | Ingredient |
| 0.79 | 2.08 | 2.10 | — | Afflair ® pigment |
| — | 0.17 | 0.08 | — | Ultramarine blue pigment |
| — | 0.03 | 0.04 | — | Channel black pigment |
| — | — | — | 41.01 | TFE/PPVE copolymer (Ex. 2) |
| 40.13 | — | — | — | TFE/PPVE copolymer (Ex. 3) |
| — | 41.42 | — | — | TFE/PPVE copolymer (Ex. 4) |
| — | — | 41.71 | — | TFE/PPVE copolymer (Ex. 5) |
| 6.12 | 5.80 | 5.83 | 5.86 | Acrylic polymer (Ex. 1) |
| 0.61 | 0.58 | 0.59 | 0.59 | Cerium octoate |
| 1.28 | 1.22 | 1.23 | 1.24 | Oleic acid |
| — | 0.23 | 0.24 | — | Surfynol ® 440 |
| — | — | <0.01 | — | Sodium polynapthalene sulfonate |
| 3.06 | 2.56 | 3.10 | 3.09 | Triton ® X-100 |
| 2.54 | 1.58 | 1.60 | 2.44 | Diethylene glycol monobutyl ether |
| 37.58 | 38.90 | 38.52 | 38.16 | Water |
| 4.80 | 2.59 | 2.63 | 4.63 | Triethanol amine |
| 3.10 | 2.32 | 2.35 | 2.99 | Aromatic hydrocarbon |

Example 14

An aluminum substrate was coated as outlined above, using 0.7–0.9 mil (18–23 μm) DFT of topcoat T2 from Example 13 over 0.3 mil (7 μm) DFT of primer P2 from Example 12. Inspection of the coating at 30× magnification detected no mudcracking and a defect free film. Further curing of the film at 380° C. for 15 min gave a smooth, glossy, defect-free film, showing the benefit of acrylic polymer having low decomposition temperature. The coating passed the PWA and cross-hatch tests for adhesion.

Control A

Example 14 was repeated except that the acrylic polymer of topcoat T2 was replaced by an acrylic polymer composed of 39 wt % methyl methacrylate, 57 w % ethyl acrylate and 4 wt % methacrylic acid and having a maximum decomposition rate in the range of 380°–400° C. as measured by TGA. Inspection of the coating at 30× magnification revealed no mudcracking and a defect free film. However, further curing of the film at 380° C. for 15 min resulted in a very rough film with a dull appearance. Inspection of the coating at 30× magnification revealed that the coating had crawled during the curing step, showing a deficiency of acrylic polymer having high decomposition temperature.

Example 15

An aluminum substrate was coated as outlined above, using 0.7–0.9 mil (18–23 μm) DFT of topcoat T3 from Example 13 over 0.3 mil (7 μm) DFT of primer P3 from Example 12. Inspection of the coating at 30× magnification detected no mudcracking and a defect free film. Further curing of the film at 380° C. for 15 min gave a smooth, glossy, defect-free film, showing the benefit of acrylic polymer having low decomposition temperature in conjunction with melt-fabricable fluoropolymer having high MV. The coating passed the PWA and cross-hatch tests for adhesion.

Example 16

Example 15 was essentially repeated except that the TFE/PPVE copolymer of Example 5 was replaced with the TFE/PPVE copolymer of Example 6 in both of topcoat T3 and primer P3 formulations. Inspection of the coating at 30× magnification revealed no mudcracking and a defect free film. Further curing of the film at 400° C. for 10 min gave a smooth, glossy, defect free coating, again showing the benefit of acrylic polymer having low decomposition temperature in conjunction with high-MV fluoropolymer. The coating passed the PWA and cross-hatch tests for adhesion.

Example 17

Primer formulation P3 of Example 12 was repeated except that the TFE/PPVE copolymer of Example 5 was replaced in like amount by a 60:40 blend by weight of the modified PTFE of Example 8 and the FEP fluoropolymer used in primer PI. Topcoat formulation T2 of Example 13 was repeated except that the TFE/PPVE copolymer of Example 4 was replaced in like amount by the TFE/HFP/PPVE copolymer of Example 7. Using these modified primer and topcoat formulations, an aluminum substrate was coated as outlined above with 0.7–0.9 mil (18–23 μm) DFT of topcoat over 0.3 mil (7 μm) DFT of primer. Inspection of the coating at 30× magnification revealed no mudcracking and a defect free film. Further curing of the film at 380° C. for 15 min gave a smooth, glossy, defect-free film, showing the utility of melt-fabricable fluoropolymer other than TFE/PPVE dipolymer in conjunction with acrylic polymer having low decomposition temperature in dispersion compositions of this invention. The coating passed the PWA and cross-hatch tests for adhesion.

Example 18

Topcoat formulation T4 of Example 13 was sprayed on at 1.0 mil (25 μm) DFT on aluminum panels and air dried. No prime coat was used. Examination of the coating at 30× with an optical microscope revealed a smooth continuous film with no signs of mudcracking. Curing of the film at 360° C. for 20 min gave a smooth defect free film. This procedure was repeated except that the TFE/PPVE copolymer of Example 2 was replaced in like amount in the topcoat formulation by the TFE/PPVE copolymer of Example 10. Examination of the coating at 30× magnification revealed mudcracking throughout the film. Curing of the film at 360° C. for 20 min gave a rough film as a result of the mudcracking. While the copolymer of Example 10 is useful in thinner coatings of this invention, this comparison shows the benefit of the larger particle size of the copolymer of Example 2 in dispersion compositions of this invention to achieve greater coating thickness.

Example 19

An aluminum substrate was coated as outlined above, using 0.7–1.0 mil (18–25 μm) DFT of topcoat T1 from Example 13 over 0.3 mil (7 μm) DFT of primer P1 from Example 12. Inspection of the coating at 30× magnification detected no mudcracking and a defect free film. Further curing of the film at 380° C. for 15 min gave a smooth, glossy, defect-free film. This procedure was repeated except that the TFE/PPVE copolymer of Example 3 was replaced in like amount in the topcoat formulation by the TFE/PPVE copolymer of Example 11. Examination of the coating at 30× magnification revealed mudcracking throughout the film. Curing of the film at 380° C. for 20 min gave a rough film as a result of the mudcracking. While the copolymer of Example 11 is useful in thinner coatings of this invention, this comparison again shows the benefit of the larger particle size of the copolymer of Example 3 in dispersion compositions of this invention to achieve greater coating thickness. The coating passed the PWA and cross-hatch tests for adhesion.

The following is claimed:

1. A dispersion composition comprising aqueous medium, particles comprising at least one melt-fabricable fluoropolymer, and particles comprising at least one acrylic copolymer having a decomposition temperature of less than 340° C. as determined by thermogravimetric analysis, wherein the dispersion contains about 75 to about 95 wt % fluoropolymer and about 5 to about 25 wt % acrylic copolymer, based on combined weights of the two polymers.

2. The dispersion composition of claim 1, wherein said fluoropolymer comprises perfluorinated tetrafluoroethylene copolymer.

3. The dispersion composition of claim 2, wherein said copolymer comprises a copolymer of tetrafluoroethylene with at least one comonomer in the group consisting of perfluoroolefins having at least three carbon atoms and perfluoro(vinyl ethers) of the formula $CF_2=CFOR$ or $CF_2=CFOR'OR$ wherein —R, and —R'— are independently completely-fluorinated linear or branched alkyl and alkylene groups containing 1–8 carbon atoms.

4. The dispersion composition of claim 3, wherein said comonomer comprises at least one member selected from the group consisting of hexafluoropropylene, perfluoro (methyl vinyl ether), and perfluoro(propyl vinyl ether).

5. The dispersion composition of claim 1, wherein said acrylic copolymer has glass transition temperature of less than about 40° C.

6. The dispersion composition of claim 5, wherein said acrylic copolymer comprises a copolymer of butyl methacrylate and methacrylic acid.

7. The dispersion composition of claim 6, wherein said acrylic copolymer comprises from about 93% to about 98% by weight of butyl methacrylate and from about 7% to about 2% by weight of methacrylic acid.

8. A coated article comprising a substrate coated with a coating having at least two layers, comprising a prime coat, a topcoat, and optionally one or more intermediate coats between said primer and said topcoat, wherein at least one of said topcoat and intermediate coats is formed from the dispersion composition of claim 1.

9. The coated article of claim 8, wherein said topcoat and said optional intermediate coats are each formed from a dispersion composition comprising aqueous medium, particles comprising at least one melt-fabricable fluoropolymer, and particles comprising at least one acrylic copolymer having a decomposition temperature of less than 340° C. as determined by thermogravimetric analysis, wherein the dispersion contains about 75 to about 95 wt % fluoropolymer and about 5 to about 25 wt % acrylic copolymer, based on combined weights of the two polymers.

10. The coated article of claim 8, wherein said prime coat comprises at least one adhesion promoter and at least one melt-fabricable fluoropolymer having melt viscosity of from about $15 \times 10^3$ to about $200 \times 10^3$ Pa.s.

11. The coated article of claim 8, wherein said prime coat comprises adhesion promoter and non-melt-fabricable tetrafluoroethylene copolymer, said copolymer containing at least about 0.001% by weight of modifying comonomer and having standard specific gravity of at least about 2.165 and melt viscosity in the range from about $1 \times 10^7$ to about $1 \times 10^9$ Pa.s.

12. The dispersion of claim 1 wherein the average diameter of the fluoropolymer particles ranges from about 100 to about 500 nm.

13. The composition of claim 1 wherein said melt-fabricable fluoropolymer has a melt viscosity of from about $15 \times 10^3$ to about $200 \times 10^3$ Pa.s.

14. A coated article comprising a substrate coated with a coating having at least two layers, comprising a prime coat, a topcoat, and optionally one or more intermediate coats between said primer and said topcoat, wherein said prime coat comprises adhesion promoter and melt-fabricable fluoropolymer having melt viscosity of from $15 \times$ about $10^3$ to about $200 \times 10^3$ Pa.s and wherein at least said topcoat comprises about 75 to about 95 wt % melt-fabricable fluoropolymer and about 5 to about 25 wt % of at least one acrylic copolymer having a decomposition temperature of less than about 340° C. as determined by thermogravimetric analysis, based on combined weights of the two polymers.

* * * * *